Aug. 11, 1959     H. J. WINGER     2,899,213
HEAVY EQUIPMENT MOVING DEVICE

Filed April 16, 1956     2 Sheets-Sheet 1

Howard J. Winger
INVENTOR.

BY *[signatures]*
Attorneys

Aug. 11, 1959 H. J. WINGER 2,899,213
HEAVY EQUIPMENT MOVING DEVICE
Filed April 16, 1956 2 Sheets-Sheet 2
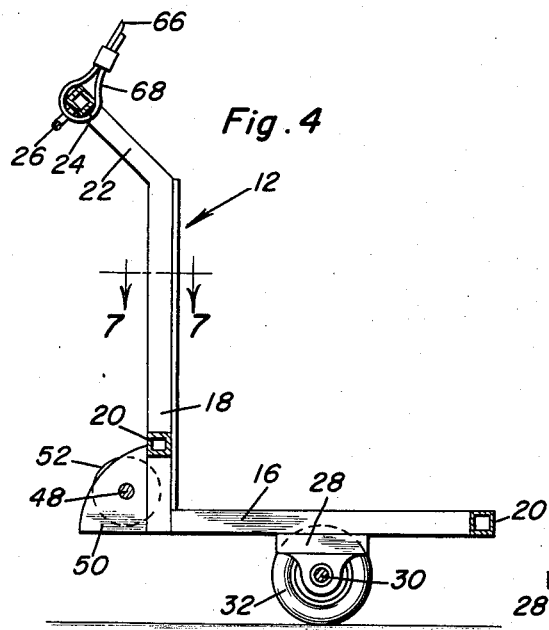
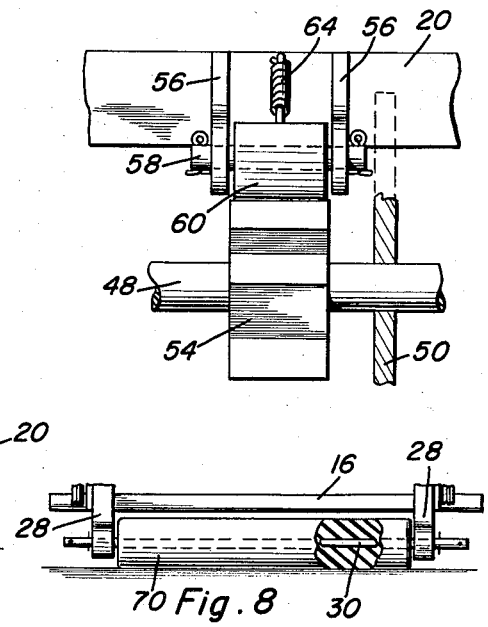
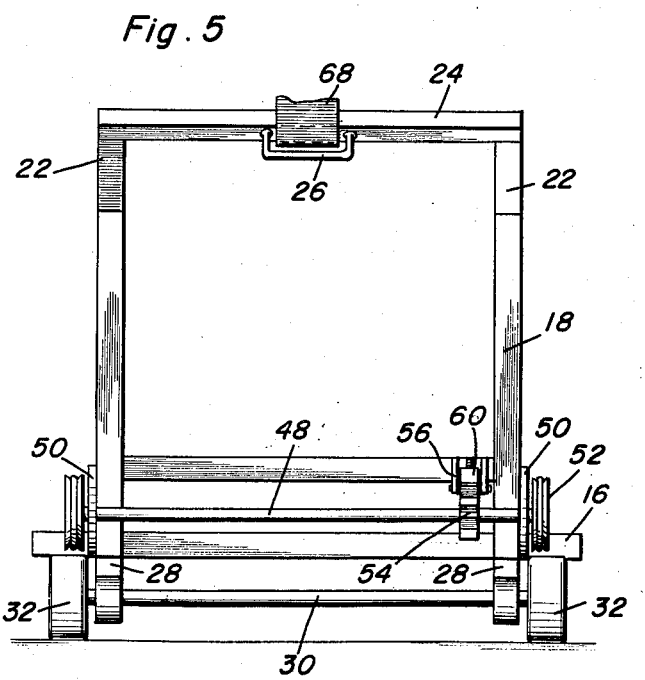
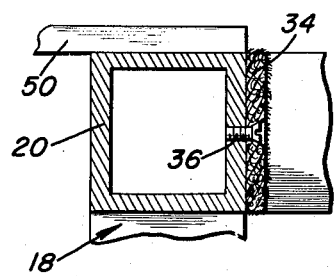
Howard J. Winger
INVENTOR.

United States Patent Office 2,899,213
Patented Aug. 11, 1959

2,899,213

HEAVY EQUIPMENT MOVING DEVICE

Howard J. Winger, Spring Church, Pa.

Application April 16, 1956, Serial No. 578,417

5 Claims. (Cl. 280—47.13)

This invention comprises a novel and useful heavy equipment moving device and more particularly relates to a dolly assembly together with means for effectively securing the same to a heavy and bulky object for convenient transportation of the latter.

The primary object of this invention is to provide an apparatus which will facilitate the moving of heavy and bulky objects such as deep freeze cabinets, refrigerators, and the like.

A further object of the invention is to provide a moving apparatus for heavy loads which may be quickly and easily applied thereto and removed therefrom, and yet may be securely and firmly attached to the object for moving the same.

Yet another object of the invention is to provide a moving apparatus comprising a pair of dollies which may be readily secured to heavy objects of various sizes and shapes to facilitate moving and handling of the same.

A further important object of the invention is to provide a moving device consisting of a pair of dollies having an improved means whereby the same may be securely applied to a heavy object to be moved, and whereby provision is made for varying the tensioning force by which the dollies are secured to the object.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a view taken upon an enlarged scale substantially upon the plane indicated by the section line 4—4 of Figure 2 and showing the construction of one of the dollies;

Figure 5 is an end elevational view of one of the dollies which carries the tensioning means, this being the dolly shown at the left end of Figures 1 and 2;

Figure 6 is a detail view showing partly in elevation and partly in section the ratchet construction of the tensioning device of the invention;

Figure 7 is a detail view taken upon an enlarged scale substantially upon the plane indicated by the horizontal section line 7—7 of Figure 4; and Figure 8 is a further detail view showing partly in elevation and partly in section a modified form of supporting roller for the dollies.

The fundamental purpose of this invention is to provide an inexpensive, generally light weight and compact dolly assembly whereby large and bulky objects such as deep freeze cabinets, refrigerators and the like, may be easily handled and moved; and whereby the dollies may be securely attached to the object to be moved and may be quickly and easily applied thereto or removed therefrom.

Figure 1:
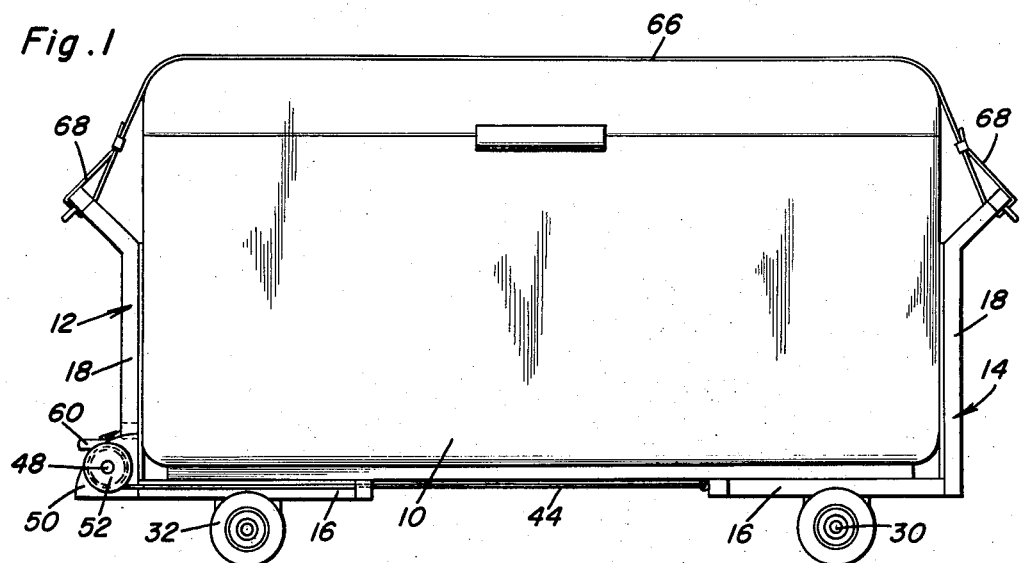
Figure 1 is a side elevational view showing the improved moving device in accordance with this invention applied to a heavy object to facilitate handling and moving of the same.
Figure 2:
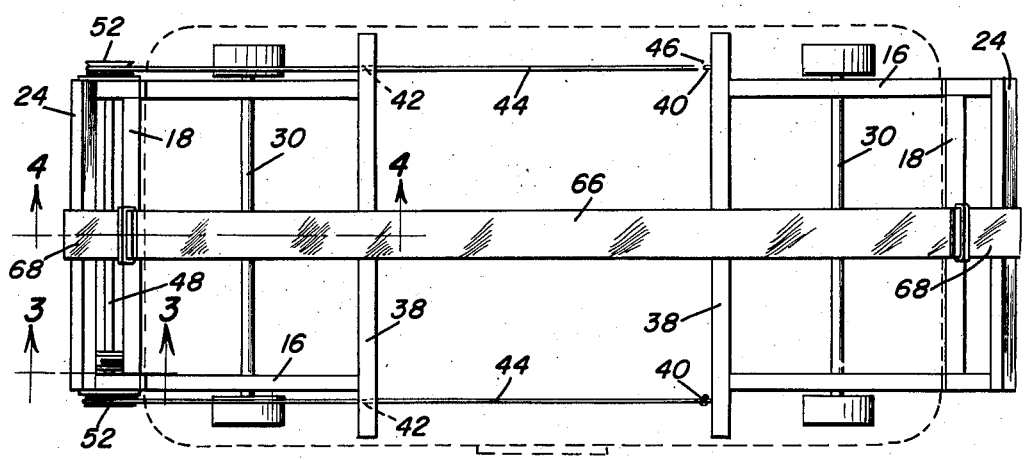
Figure 2 is a top plan view of Figure 1, the object to be moved being shown in dotted lines therein in order to more clearly show the top surface of the dollies and the manner in which the load is supported thereby.

In accordance with this invention, there is illustrated in the accompanying drawings the device for moving heavy loads and shown applied to a heavy object to be moved indicated by the numeral 10, which may constitute a deep freeze cabinet or any other bulky and heavy object. The apparatus itself consists of a pair of dollies indicated generally by the numerals 12 and 14, which preferably have the same framework structure, and consequently a description of one will serve to identify both. Referring now especially to Figures 4 and 5 it will be seen that each of the dollies is of L-shaped configuration, having a substantially horizontal flat bed or platform 16, thus providing a horizontal supporting surface for an object, together with a vertical flat side wall 18. The latter is adapted, as shown in Figure 1, to engage an end or side wall of the object 10 when the bottom of the same rests upon the horizontal supporting platform 16.

Each of the elements 16 and 18 preferably comprises a plurality of elongated hollow structural members 20, which as illustrated may be of horizontal cross-section, and which are united together in any desired manner as by welding or the like in order to provide a rigid supporting frame.

At their upper ends, the side walls or side members 18 are provided with upwardly and outwardly inclined portions 22 having a cross member 24 secured to the upper ends of the same to thus provide a handle. Intermediate the ends of the handles 24, and projecting downwardly therefrom is a bail 26 for a purpose to be subsequently set forth.

The horizontal member 16, intermediate the ends of the same is provided with suitable depending pillow blocks 28, which serve to journal transverse axles 30. In the embodiment of Figures 1–7, suitable supporting wheels 32 are carried by these axles and thus support the dolly and the load carried thereby.

In order that the finish of the object 10 to be carried by the dollies shall not be marred while the dollies are applied thereto, there is preferably provided a suitable cushioning pad or layer of material 34, see Figure 7, which is applied to the members 20 of the vertical or side member 18. Conveniently, this cushioning pad may be of felt or other suitable protecting material, and is secured to the frame members as by recessed screws or the like 36.

As so far described, the construction of the two dollies is identical. It will be observed, however, from Figure 2 that the dolly 14, at the end remote from the side member 18, has its horizontal member 16 provided with a transversely extending end member 38 having forwardly extending screw bolts or eyes 40. The corresponding end of the other dolly 12 has a corresponding cross bar 38, which if desired may be suitably apertured as indicated by the dotted lines at 42. A tensioning means in the form of cables 44 are provided with hooks 46 which engage in the eye bolts 40, the cables themselves extending through the apertures 42, and then being secured to and wound upon a winch carried by the dolly 12. This winch comprises a transverse shaft 48 journaled in suitable brackets or flanges 50 which are mounted upon the side members 20 of the dolly 18, the ends of the shaft having spools or reels 52 for receiving the ends of the tensioning means or cables 44.

Figure 3:
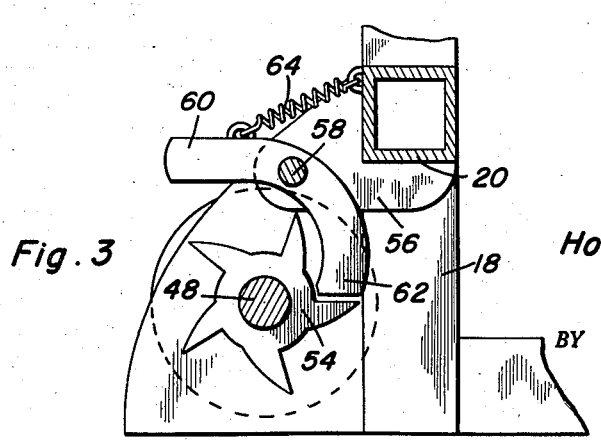
Figure 3 is a detail view taken upon an enlarged scale in vertical longitudinal section substantially upon the plane indicated by the section line 3—3 of Figure 2 and showing in particular a ratchet locking means for the tensioning means of the device.

As will be more readily apparent from Figures 5 and 6, the winch shaft 48 between its supporting brackets 50 has secured thereto a ratchet wheel 54 and as will be best apparent from Figures 3 and 6, a horizontally extending frame member 20 of the side member or wall 18 is provided with outwardly and downwardly extending brackets or lugs 56 between which is journaled as by a pivot 58, a bent lever or ratchet pawl 60. The latter has an end 62 engageable with the teeth of the ratchet member 54, while a tension spring 64 secured to the pawl and to the member 20 yieldingly urges the pawl into engagement with the ratchet member 54.

Any suitable means may be provided for causing rotation of the shaft 48 whereby the reels 52 will serve to tension the cables 44 and thus urge the two dollies towards each other.

A pliable or flexible member preferably in the form of a strap or belt 66 has its loop extremities 68 secured to the previously mentioned bails 26 of the handles 24. The operation of the device is as follows.

The heavy object to be carried by the dollies is placed upon the horizontal surface of the same, as shown in Figure 1, with the end walls of the object engaged by the pads 34 of the side members 18 of the two dollies. The strap 66 is then applied, being extended across the top of the article to thereby hold and clamp the same downwardly upon the horizontal supporting platforms of the dollies, and to secure the top portions of the side walls 18 of the dollies against the sides of the object. The tensioning means is then tightened by rotation of the winch shaft 38 in any suitable manner, whereby the dollies are drawn tightly together. This clamping action of the straps at the top of the article and the tension means at the bottom of the same will thus rigidly and tightly clamp the dollies to the article and cause them to function as a rigidly attached wheeled support for the same. It will be observed that the tensioning means by virtue of the mounting of the eyes 40 and of the apertures 42 is disposed below the horizontal surface of the platform 16 of the dollies.

It will thus be apparent that the dollies may be readily applied to and removed from the article to be carried, whereby the article may be readily rolled upon the supporting wheels, or may be lifted by the handles 24.

In some instances, it may be preferred to replace the supporting wheels 22 by supporting rollers such as those shown at 70 in Figure 8. This can be readily done by removing the axles 30 from their pillow blocks, positioning the rollers therebetween, then reapplying the axles. The rollers, as shown by the cut away portion of Figure 8, may be of rubber or other suitable material, and will serve to prevent damage to rugs, polished floors or the like over which the load is to be moved.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A heavy load moving device comprising a pair of L-shaped dollies each having a horizontal supporting platform and a vertical side wall at one end of the latter adapted to support and engage the bottom and side respectively of a load to be moved, each dolly having an axle and support wheels mounted thereon intermediate the ends of said dolly, a handle mounted upon and rising upwardly and outwardly from the upper end of said vertical side wall, a flexible strap secured at its ends to the handles of said pair of dollies at a position which is located vertically upward from and laterally outwardly of said side walls and adapted to overlie the top of a load for securing the same upon said dollies with the ends of said strap disposed at an acute angle to said side walls and spaced therefrom, horizontally extending tension means connected to said dollies at their horizontal platforms, means on one dolly for tightening said tension means.

2. The combination of claim 1 wherein said tension means comprises a pair of cables, one end of each cable being secured to said tightening means, the other end of each cable being attached to the other dolly at its end lying nearest said one dolly.

3. The combination of claim 1 wherein said tension means comprises a pair of cables, one end of each cable being secured to said tightening means, the other end of each cable being attached to the other dolly at its end lying nearest said one dolly, the adjacent edges of said horizontal platforms of said dollies having transversely extending end members, each operatively engaging said cables, the end member of said one dolly being apertured and slidably receiving said cables therethrough.

4. The combination of claim 1 wherein said tension means comprises a pair of cables, one end of each cable being secured to said tightening means, the other end of each cable being attached to the other dolly at its end lying nearest said one dolly, said tightening means comprising a winch mounted upon said one dolly outwardly of the side wall thereof, said cables being attached to said winch.

5. The combination of claim 1 wherein said tension means comprises a pair of cables, one end of each cable being secured to said tightening means, the other end of each cable being attached to the other dolly at its end lying nearest said one dolly, said tightening means comprising a winch mounted upon said one dolly outwardly of the side wall thereof, said cables being attached to said winch, a ratchet wheel secured to said winch between the sides of said one dolly and adjacent the horizontal platform of the latter, a pawl pivoted upon said side wall of said one dolly and engaging said ratchet wheel.

References Cited in the file of this patent

UNITED STATES PATENTS

| Number | Name | Date |
| --- | --- | --- |
| 1,268,178 | Stutz | June 4, 1918 |
| 1,520,630 | Bateman | Dec. 23, 1924 |
| 2,113,780 | Yeats | Apr. 12, 1938 |
| 2,219,609 | Askeris | Oct. 29, 1940 |
| 2,439,851 | Higgins | Apr. 20, 1948 |
| 2,450,690 | Robins | Oct. 5, 1948 |
| 2,738,204 | Ibey | Mar. 13, 1956 |
| 2,782,046 | Swain | Feb. 19, 1957 |

FOREIGN PATENTS

| Number | Country | Date |
| --- | --- | --- |
| 346,999 | Italy | Mar. 13, 1937 |